United States Patent [19]

Wulf

[11] Patent Number: 5,157,456
[45] Date of Patent: Oct. 20, 1992

[54] DOUBLE MONOCHROMATOR

[75] Inventor: Jurgen Wulf, Uberlingen, Fed. Rep. of Germany

[73] Assignee: Bodenseewerk Perkin Elmer GmbH, Uberlingen, Fed. Rep. of Germany

[21] Appl. No.: 625,277

[22] Filed: Dec. 10, 1990

[30] Foreign Application Priority Data

Nov. 11, 1989 [DE] Fed. Rep. of Germany ....... 3937599

[51] Int. Cl.$^5$ ............................................. G01J 3/18
[52] U.S. Cl. .................................... 356/333; 356/334
[58] Field of Search ................. 356/331, 332, 333, 334

[56] References Cited

U.S. PATENT DOCUMENTS

| 4,102,576 | 7/1978 | Maeda et al. | 356/333 |
| 4,468,121 | 8/1984 | Koizumi et al. | 356/333 |
| 4,697,924 | 10/1987 | Akiyama | 356/333 |
| 4,981,357 | 1/1991 | Minakawa et al. | 356/333 |

FOREIGN PATENT DOCUMENTS

| 0183415 | 6/1986 | European Pat. Off. |
| 161534 | 10/1982 | Japan | 356/333 |

OTHER PUBLICATIONS

"Journal Physics E/Scientific Instruments", Aug. 1988, pp. 798-804.
V. Mazzacurati et al.: "A New Class of Multiple Dispersion Grating Spectrometers".
"Patent Abstracts of Japan" vol. 4, No. 14 (E-114)(169) 31, Jan. 31, 1980.
"Double Spectroscope", Hitachi Seisakusho K.K., Dec. 5, 1979.

Primary Examiner—F. L. Evans
Attorney, Agent, or Firm—Thomas P. Murphy; Edwin T. Grimes

[57] ABSTRACT

A double monochromator comprises an inlet slit 20, which is imaged in the plane of an intermediate slit 34 through a first grating monochromator 36. The intermediate slit 34 is imaged in the plane of the outlet slit 34 through a second grating monochromator 58 identical with the first grating monochromator 36. Deflecting mirrors 64 and 66 can be moved into the path of rays to enable such a double monochromator to be optionally used as a single monochromator with increased light flux. An additional slit is arranged between the deflecting mirrors 64 and 66. The arrangement is such so that essentially identical beam geometries result at the outlet in both of the operation modes.

5 Claims, 2 Drawing Sheets

DOUBLE MONOCHROMATOR

TECHNICAL FIELD

A double monochromator defining a path of rays and containing an entrance slit which is imaged in the plane of an intermediate slit through first dispersing means, an exit slit, second dispersing means, through which the intermediate slit is imaged in the plane of the exit slit, and a first deflecting mirror which is movable into the path of rays precedingly of the intermediate slit as viewed in the radiative direction.

BACKGROUND ART

A double monochromator serves to obtain a higher spectral resolution with a given slit width than a single monochromator. In addition, the stray light is very much decreased in a double monochromator.

Single monochromators comprise a light source unit with a light source and a concave mirror, by which the light source is imaged onto the inlet slit of the proper monochromator. Light of different wave lengths, a continuum, for example, impinges upon the inlet slit in such a single monochromator. This light does not run only along the ideal theoretical path of rays through the apparatus, whereby only a defined spectral band would pass through the outlet slit. In fact, a certain portion of the light, having entered through the inlet slit, also passes to the outlet slit by other routes through scattering or the like, such that a component of other undesirable wave lengths also appears besides the desired spectral band at the outlet slit. Indeed, this component can possible be small. But the ratio of useful signal to interfering signal can deteriorate in an intolerable way due to unfavorable lamp sensitivity characteristics of many photoelectric receivers, which have a steeply declining flank at the edge of the scanned wave length range.

Essentially, only light of the desired wave length passes through the outlet slit of the monochromator on the entrance side in a double monochromator. The stray light is subjected to a new dispersion in the second monochromator on the outlet side, such that again only a certain fraction of this stray light passes to the outlet slit through scattering or the like. But this component of stray light is, however, very small after passing through a double monochromator. In addition, a new dispersion of the useful light occurs, such that the spectral resolution of the monochromator is improved with a given slit width.

German Published Patent Application No. 3,511,676, published on Oct. 3, 1985, cognate with U.S. Pat. No. 4,697,924, granted Oct. 6, 1987, describes four constructions of a double monochromator containing an entrance slit which is imaged in the plane of a median slit by first dispersing means, and an exit slit as well as second dispersing means, by means of which the median slit is imaged in the plane of the exit slit. This double monochromator also can be operated as a single monochromator. For this purpose, the first dispersing means are arranged at a rotatable base conjointly with a mirror which may be a concave mirror or a planar mirror, in a manner such that, for the double monochromator function, the first dispersing means and, for the single monochromator function, the mirror is respectively pivoted into the path of rays of the double monochromator. In the latter case, the mirror is placed precedingly of the median slit as viewed in the radiative direction.

In this known construction, the mirror replaces the first dispersing means in the path of rays for the single monochromator function. Consequently, the pivoting movement of the deflecting mirror requires also pivoting the dispersing means and decoupling the same from the associated wavelength drive means.

German Published Patent Application No. 3,640,044, published Jun. 1, 1988, relates to a monochromator arrangement including a single monochromator in connection with a path of rays, for example, of an adjustable infrared laser. The path of rays extends transversely relative to the monochromator through a deflection assembly housing containing an entrance diaphragm and an exit diaphragm. First and second deflecting mirrors are located therebetween and are arranged perpendicular to each other. The second deflecting mirror is transversely offset from the first deflecting mirror with respect to the path of rays. The first deflecting mirror deflects the incoming beam into the monochromator which directs an exit beam to further deflecting mirrors arranged following the exit diaphragm for passing the exit beam which has been deflected at the second deflecting mirror, to the path of rays leading to a detector.

From German Published Patent Application No. 3,443,727, published Jun. 12, 1986, there is known a microphotometer for image and wavelength scanning. Therein, a measuring diaphragm is displaceable, for scanning purposes, transversely relative to a path of rays leading to a detector and containing a lens. Optical deflection means can be inserted into the path of rays and contain mirrors which deflect the incoming light onto a path of rays extending through a single monochromator for wavelength scanning. This arrangement utilizes two displaceably arranged deflecting mirrors in order to direct light away from the predetermined path of rays and through the single monochromator back onto the path of rays.

U.S. Pat. No. 4,102,576, granted Jul. 25, 1978, relates to a double monochromator containing an entrance slit which is imaged in the plane of a median slit by first dispersing means, and an exit slit as well as second dispersing means by means of which the median slit is imaged in the plane of the exit slit. The slits are defined by respective slit jaws formed at two slit plates which are displaceable relative to each other by means of a wedge. In this manner, there can be adjusted an optimum exit band width for each double monochromator configuration.

German Patent No. 2,730,613, published on Jul. 26, 1979, relates to a double monochromator containing an input monochromator including a diffraction grating and a main monochromator including a diffraction grating. The input monochromator images a light source at the entrance slit of the main monochromator. A filter wheel is located between the light source and the input monochromator. The diffraction gratings and the filter wheel are coupled to a wavelength drive, particularly in a manner such that the diffraction grating of the input monochromator can be driven by means of a linear servo drive. In a further development described in German Patent No. 3,113,984, published Dec. 1, 1983, a second light source is provided and the filter wheel is constructed as a filter slide containing a planar mirror for reflecting light which is emitted by the second light source, into the path of rays of the input monochromator.

U.S. Pat. No. 4,310,244, granted Jan. 12, 1982, describes with reference to FIG. 4 therein a single monochromator containing two diffraction gratings which cooperate with a spherical mirror. A mirror which may assume two predetermined positions is located intermediate the diffraction gratings. In a first position of the mirror, light originating from the spherical mirror is led to the first diffraction grating, and in the second position of the mirror this light is directed to the second diffraction grating. The adjustment of the mirror is coupled with the wavelength drive so that the single monochromator is operated using selectively either the first or the second diffraction grating depending upon the control of the wavelength range.

The use of a double monochromator decreases the amount of stray light and increases the spectral resolution of the monochromators. But a double monochromator is attended with a loss of light. There are cases where the suppression of stray light and the increase of the spectral resolution of the monochromators are essential. But there are also cases where an increase of the light flux passing through the monochromator is desired for generating a sufficient signal by sacrificing high spectral resolution.

DISCLOSURE OF THE INVENTION

It is an object of the invention to design a double monochromator of the above-mentioned type in such a way that it works, in a simple way and without readjustment of the slit width, optionally with good suppression of the stray light and high spectral resolution, accepting a relatively low light flux, or with an increased light flux (compared with the first mentioned mode of operation), accepting lower spectral resolution.

According to the invention, this object is achieved by a second deflecting mirror movable into the path of rays conjointly with the first deflecting mirror and following the exit slit, as viewed in the radiative direction, independent of the first and second dispersing means, and an additional slit arranged between the deflecting mirrors.

In this way, the apparatus with the inlet-side first dispersing means can be used as a single monochromator. The path of rays is deflected in front of the intermediate slit and is deflected behind the outlet slit in the direction of the light beam normally emerging from the outlet slit. The additional slit serves as outlet slit of this single monochromator Thus, an increased light flux results with reduced spectral resolution. When the deflecting mirrors are moved out of the path of rays, the apparatus operates in the usual way as a double monochromator with increased spectral resolution and increased suppression of stray light, but with reduced light flux. This changeover can occur in a simple way, if required, without manipulation at the slit widths being necessary.

In a preferred embodiment of the invention, the beam axes of the light beams passing through the intermediate slit and the outlet slit are anti-parallel. That means that the beam axes are geometrically parallel but that the running directions of the light beams are opposite to each other. The planes of the deflecting mirrors which can be moved into the path of rays form a right angle. Thereby, with deflecting mirrors not moved into the path of rays, the light beam directed upon the intermediate slit is reflected along the axis of the light beam passing through the outlet slit. Preferably, the deflecting mirror moved into the path of rays forms an angle of 45° with the beam axis of the light beam. The deflecting mirror moved into the path of rays behind the outlet slit forms an angle of 135° with the beam axis of the light beam passing through the outlet slit. The deflecting mirrors can be moved into the path of rays in front of the intermediate slit or behind the outlet slit, respectively, at distances equal to half the distance of the anti-parallel light beams. The additional slit is arranged in the middle between the anti-parallel light beams. The light beam in front of the intermediate slit is deflected by 90° when the apparatus operates as a single monochromator. It passes through the additional slit. The beam geometry at this additional slit is the same as that at the intermediate slit. The light beam is deviated again by 90° by the second deflecting mirror. Then it runs along the axis of the light beam, which emerges from the outlet slit in a double monochromator operation.

The first and second dispersing means are identical grating monochromators. This ensures that the beam geometry of the light beam passing through the additional slit and being deviated from the deflecting mirror is essentially identical with the beam geometry of the light beam which emerges from the outlet slit in a double monochromator operation.

An embodiment of the invention will now be described in greater detail with reference to the accompanying drawings:

PREFERRED EMBODIMENT OF THE INVENTION

Figure 1:
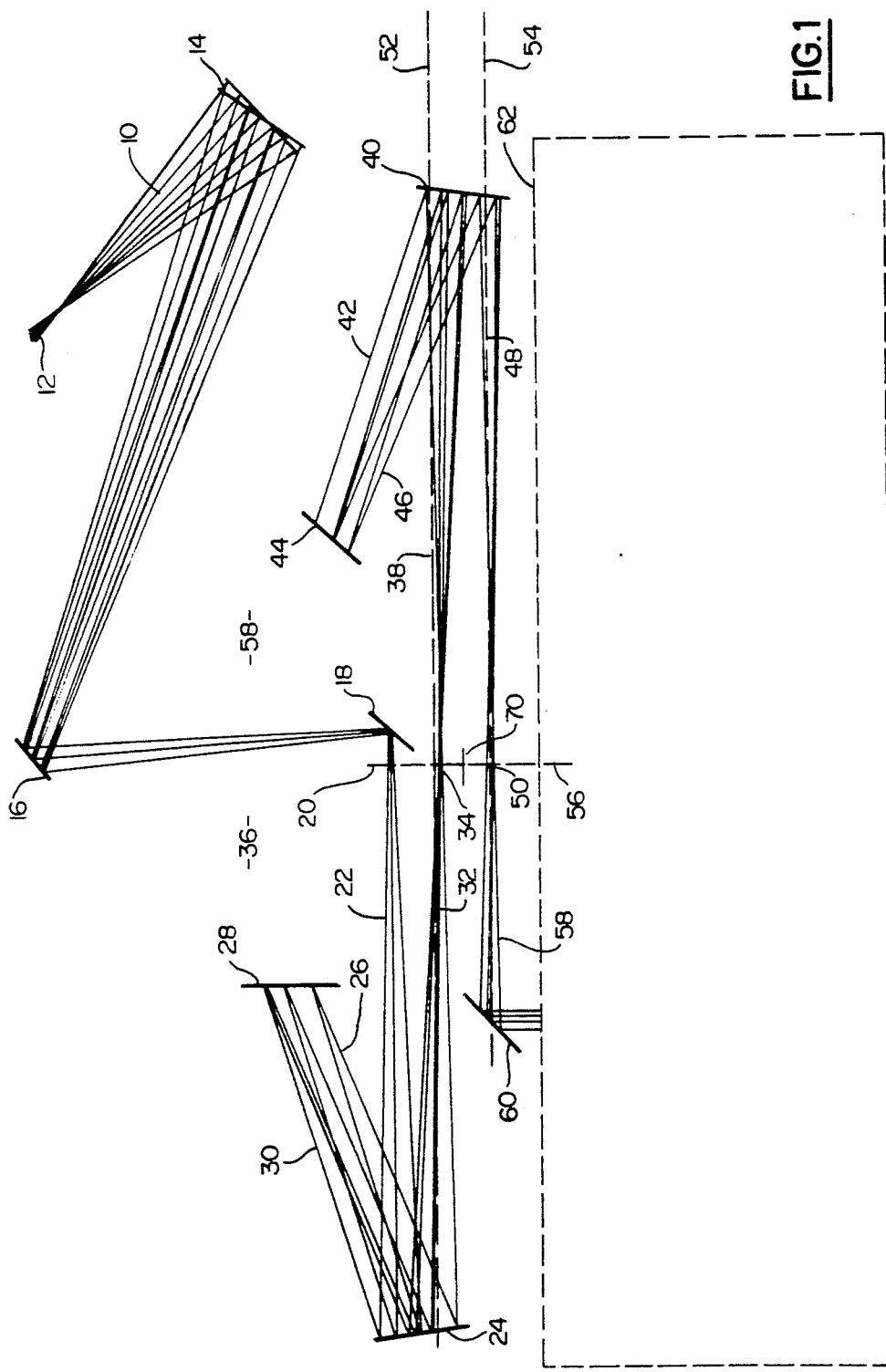
FIG. 1 shows a path of rays of a double monochromator, which is arranged to be used optionally as a double monochromator or a single monochromator, in the operation mode "double monochromator"
Figure 2:
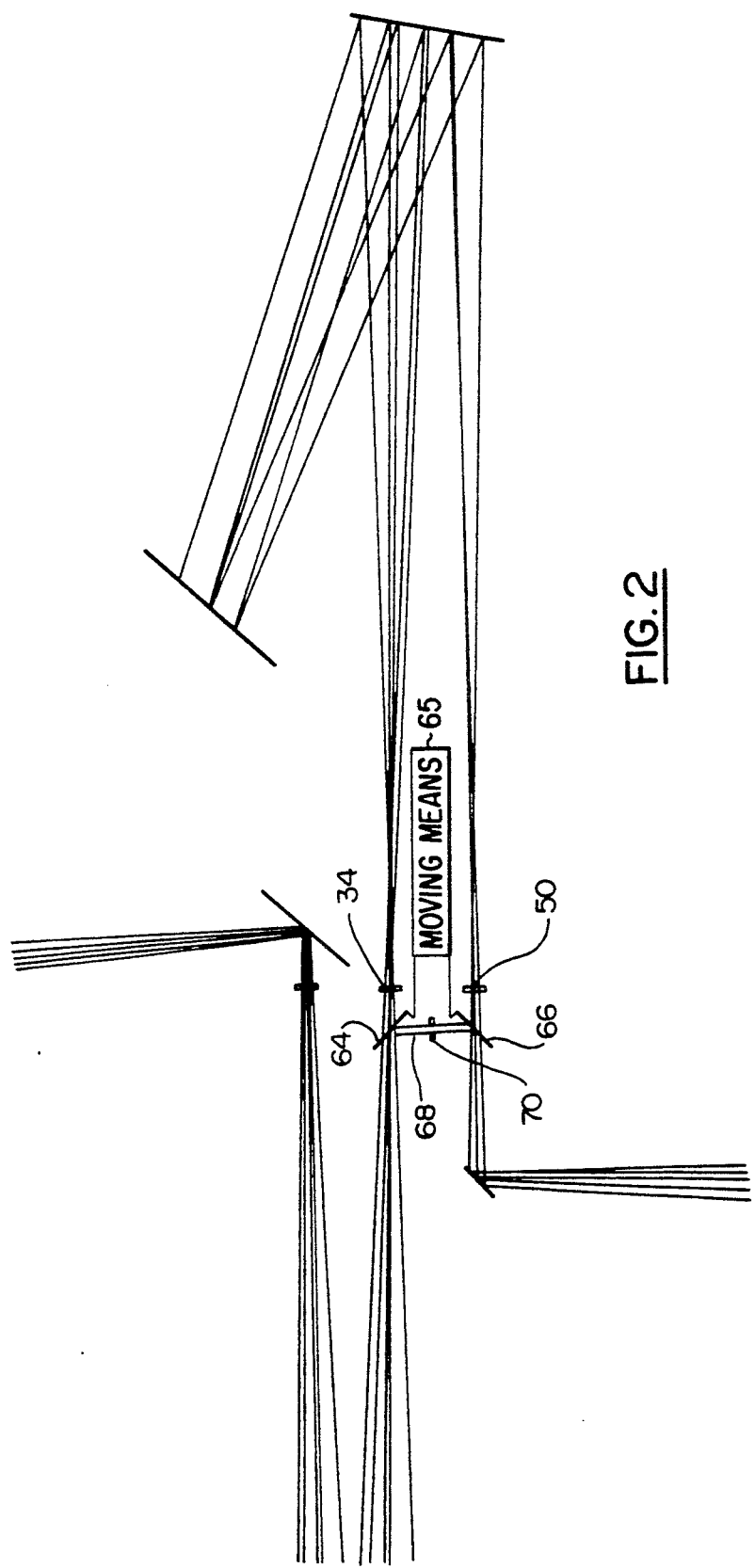
FIG. 2 shows a portion of the path of rays of FIG. 1 in the operation mode "single monochromator"

A light beam 10 emerges from a light source 12. The light beam 10 is focused on an inlet slit 20 by a spherical mirror 14 through a cylinder mirror 16 and a spherical mirror 18. The light passing through the inlet slit 20 forms a light beam 22. The light beam 22 is collimated by a spherical mirror 24. The parallel light beam 26 obtained in that way impinges upon a grating 28. The grating 28 effects a dispersion in the known way. Parallel light beams are formed at different angles to the grating 28 and with different wave lengths. Only one such parallel light beam 30 is illustrated in the figure. The light beam 30 impinges again onto the spherical mirror 24. The spherical mirror 24 focuses the light of the parallel light beam 30 in a convergent light beam 32 on an intermediate slit 34. The spherical mirror 24 and the grating 28 form a first grating monochromator 36, the outlet slit of which is formed by the intermediate slit. This first grating monochromator represents the "first dispersing means" mentioned above.

The light beam 38 passing through the intermediate slit 34 impinges upon a spherical mirror 40. The spherical mirror 40 collimates the light beam 38. It impinges as a parallel light beam 42 onto a second grating 44. A second spectral dispersion of the light occur again at the grating 44. A parallel light beam 46 observed here impinges again onto the spherical mirror 40. The spherical mirror 40 generates a convergent light beam 48, which is focused on an outlet slit 50. The beam axes of the light beams 32 and 38, which pass through the intermediate slit 34, and the light beam 48, which passes through the outlet slit 50, are designated as 52 or 54, respectively.

The beam axes 52 and 54 are anti-parallel to each other: both of the beam axes 52 and 54 are geometrically parallel, but the running directions of the light along both of the beam axes 52 and 54 are opposite to each other. The inlet slit 20, the intermediate slit 34, and the outlet slit 50 are located in a common plane 56, which extends perpendicular to the beam axes 52 and 54 of beam 32, 38, or 48, respectively.

The spherical mirror 40 and the grating 44 form a second grating monochromator 58. This second grating monochromator forms the "second dispersing means".

The diverging light beam 58 passing through the outlet slit 50 is deflected by a deflecting mirror 60 and passes to the sample and detector unit of a spectrophotometer. This sample and detector unit is known per se and is not illustrated here in detail. The sample and detector unit generally is provided with reference number 62.

The arrangement described up to now is essentially known.

According to the invention, a first deflecting, mirror 64 in front of the intermediate slit 34 can be moved by moving means 65 into the path of rays, pivoted into, for example. In like manner, a second deflecting mirror 66 behind the outlet slit 50 can be moved into the path of rays by moving means 65. The deflecting mirror 64 forms an angle of 45° with the beam axis 52 of the light beam 32. Therefore, the light beam 32 is deflected by a right angle in front of the intermediate slit 34. Then the light beam impinges onto the second deflecting mirror 66. The second deflecting mirror forms an angle of 135° with the beam axis 54 of the light beam 48 passing through the outlet slit 50 in a double monochromator operation. Thereby, the deflected light beam 68 is deflected again by 90° by the second deflecting mirror 66. Then it runs along the axis 54 of the light beam 48 in the same direction as this one. In this way, the light beam is also directed onto the sample and detector unit 62 of the spectral photometer by the deflecting mirror 60. An additional slit 70 is arranged between the deflecting mirrors 64 and 66.

The first deflecting mirror 64 can be moved into the path of rays in front of the intermediate slit 34 at a distance corresponding to half the distance of the anti-parallel light beams 32 and 58. The second deflecting mirror 66 can be moved into the path of rays behind the outlet slit 50 at a distance corresponding to half the distance of the anti-parallel light beams 32 and 58. The additional slit 70 is arranged in the middle between the anti-parallel light beams 32 and 48. In this way, the geometry of the light beams directed onto the sample and detector unit is essentially the same in a double monochromator operation as it is in a single monochromator operation.

I claim:

1. A double monochromator comprising:
    first dispersing means including an entrance slit, a dispersing element, an exit slit and means for imaging the entrance slit at the exit slit and defining a beam axis of a light beam passing through the exit slit;
    second dispersing means including an entrance slit, a dispersing element, an exit slit and means for imaging the entrance slit at the exit slit and defining a beam axis of a light beam passing through the exit slit along a predetermined path of rays;
    the exit slit of the first dispersing means constituting an intermediate slit disposed intermediate the first and second dispersing means and representing the entrance slit of the second dispersing means;
    a first deflecting mirror;
    a second deflecting mirror;
    additional slit means arranged between the first and second deflecting mirrors;
    moving means for moving the first and second deflecting mirrors and the additional slit means between an inoperative position and an operative position independently of the dispersing elements of the first and second dispersing means;
    said monochromator acting in a double monochromator mode when the first and second deflecting mirrors and the additional slit means are in their inoperative positions respectively; and
    said monochromator acting in a single monochromator mode when the first and second deflecting mirrors and the additional slit means are in their operative positions respectively, whereby the first deflecting mirror intercepts the light beam in front of the exit slit of the first dispersing means in order to deflect said light beam through the additional slit means to the second deflecting mirror for passing the light beam along the predetermined path of rays defined by the second dispersing means.

2. The double monochromator as set forth in claim 1 wherein
    (a) the light beams passing through the intermediate slit and the exit slit are anti-parallel to each other and extend at a predetermined distance from each other; and
    (b) the first and second deflecting mirrors constitute planar deflecting mirrors extending at a right angle to each other.

3. The double monochromator as set forth in claim 2, wherein in said operative position
    (a) the first deflecting mirror is placed in front of the intermediate slit as viewed in the radiative direction and at an angle of 45° with the beam axis of the light beam defined by the first dispersing means;
    (b) the second deflecting mirror is placed behind the exit slit as viewed in the radiative direction and at an angle of 45° with the beam axis of the light beam defined by the second dispersing means;
    (c) the first and second mirrors are respectively arranged in front of the intermediate slit and behind the exit slit at respective distances which are half the predetermined distance of the anti-parallel light beams; and
    (d) the additional slit is arranged in the middle between the anti-parallel light beams.

4. The double monochromator as set forth in claim 3, wherein the intermediate slit and the exit slit are located in a plane perpendicular to the beam axes of the anti-parallel light beams.

5. Double monochromator as set forth in claim 3, wherein the first and second dispersing means are identical grating monochromators.

* * * * *